United States Patent [19]

Knowles

[11] Patent Number: 4,980,669
[45] Date of Patent: Dec. 25, 1990

[54] ANNUNCIATOR FOR AUTOMOTIVE SIGNAL LIGHT FLASHERS

[76] Inventor: Todd Knowles, 16040 N. 64th Dr., Glendale, Ariz. 85306

[21] Appl. No.: 424,603

[22] Filed: Oct. 20, 1989

[51] Int. Cl.⁵ .............................................. B60Q 1/26
[52] U.S. Cl. .................................. 340/474; 340/384 E
[58] Field of Search .............. 340/474, 326, 329, 331, 340/332, 384 E, 475; 307/10.8

[56] References Cited

U.S. PATENT DOCUMENTS 3,343,123 9/1967 Troesh .................................. 340/474
4,196,415 4/1980 Haar et al. ........................... 340/474

Primary Examiner—Joseph A. Orsino
Assistant Examiner—Jeffery A. Hofsass

[57] ABSTRACT

An annunciator is presented that, when connected to an automotive signal light flasher, emits an agreeable, short tone each time the signal lights are turned on by the flasher. It is suitable for use in automotive emergency flasher light circuits as well as turn signal circuits. It connects to the flasher via a special, flat interconnector that does not interfere with the normal location or operation of the flasher itself. It operates by allowing a capacitor to charge during the 'open' portion of the flasher's cycle, and as the flasher closes, discharges the capacitor through an oscillator, which in turn drives an audio transducer. The tone thereby produced is pleasant and not "elctronic' sounding because it decays with the charge of the capacitor.

4 Claims, 3 Drawing Sheets

ANNUNCIATOR FOR AUTOMOTIVE SIGNAL LIGHT FLASHERS

BACKGROUND OF THE INVENTION

The need for a signal light annunciator, loud enough to remind the driver that his signal lights have been left on inadvertently has been addressed in more than one prior patent. However, none have gained wide acceptance. It is believed that this is because the sounds they are designed to emit are unpleasant. One category, characterized by U.S. Pat. No. 4,196,415 delivers a continuous buzz during half of the flashing cycle. Another category, characterized by U.S. Pat. No. 3,343,123 delivers loud, single cycle 'click' sounds at the beginning and end of the 'on' period. It is believed that these and other prior inventions are too annoying to be considered for purchase and daily use by the average driver.

The invention herein presented, is an improvement over the Troesh invention (No. 3,343,123) in that it connects across the terminals of a standard automotive signal light flasher, uses a capacitor to store charge and uses a noise making device. However, it represents a dramatic improvement because it creates a pleasant, short burst of tone that decays naturally, not unlike a dampened piano key being struck.

This improvement is broght about through the addition of an oscillator circuit that operates at an audio frequency (usually 2 to 4 KHz) which is used to drive the audio transducer. The source of power for the entire circuit, and for the oscillator in particular is the capacitor that charges while the flasher contacts are open, as in the Troesh patent. The size of the capacitor and the resistance in its discharge path in the present invention are chosen so that the capacitor completes its discharge a fraction of a second after the flasher contacts close. This determines the length of the tone and provides the decay as the capacitor looses it's charge. The sound thus created is delivered appropriately only at the beginning of the flasher 'on' period, just as the indicator light on the automobile's dashboard is turning on.

A preferred embodiment of the invention uses a piezo-electric disc as the transducer and a modified Hartley circuit as the oscillator. The major improvement this provides is that all of the circuitry, including the capacitor and the oscillator as well as the disc, fit inside the standard plastic cases that are used industry-wide to house piezo-electric buzzers alone. These cases are attractive, are designed to resonate at the frequency of their associated discs, and already incorporate circuit boards. In fact, only these circuit boards would be changed. It is therefore predicted that the cost of this invention to the public would be very modest.

A special interconnector is also presented that improves upon the Troesh interconnector in two important ways. First, though the Troesh interconnector (referred to as a 'connecting plate' in the prior patent) does allow the flasher to be connected to both its normal signal light circuit as well as the invention, it does not allow it to occupy its normal location. This is because the interconnector is thick enough to enclose the full length of the standard flasher contacts—approximately one half inch. This creates a problem on automobiles that have covers that are installed over the flashers. The interconnector presented herein overcomes this problem by having sleeve type contacts made of thin metal that slip over the flasher contacts before the flasher is inserted into its normal socket. The sleeve contacts are held in correct orientation prior to use by a thin piece of insulator that remains connected. A pair of wires connect the interconnector to the annunciator itself.

The second improvement is that one of the contacting sleeves of the interconnector is allowed to swivel 180 degrees so that the polarity of the connection to the flasher can be reversed prior to insertion in the flasher socket. This is desirable because the present device has polarized components including the capacitor, the oscillator and the transducer, and because even though the standard flasher contact arrangement is polarized, no standard is followed in the automotive industry on the polarity of the connections to the flasher sockets themselves. This is probably because the flashers alone work equally well either way.

SUMMARY OF THE INVENTION

The primary object of the present invention is to provide a means whereby a driver is reminded that his signal lights are on by providing a short, pleasant sound each time his lights are switched on by the flasher.

Another object of the invention is to provide a sound whose volume, pitch and duration can be carefully chosen so that it not to be annoying in any way.

A further object of the invention is to provide an interconnector that provides electrical contact to the automotive flasher terminals while allowing the flasher to operate normally in its normal location.

An additional object of the invention is to provide a polarity reversing feature within the interconnector, so that the invention may be easily used on all automobiles regardless of the polarity of their flasher sockets.

Another object of the invention is to provide a device that accomplishes the above and is easy to install.

A further object of the invention is to provide a device that accomplishes the above that is ecomical to manufacture.

DETAILED DESCRIPTION OF THE DRAWING FIGURES

Figure 1:
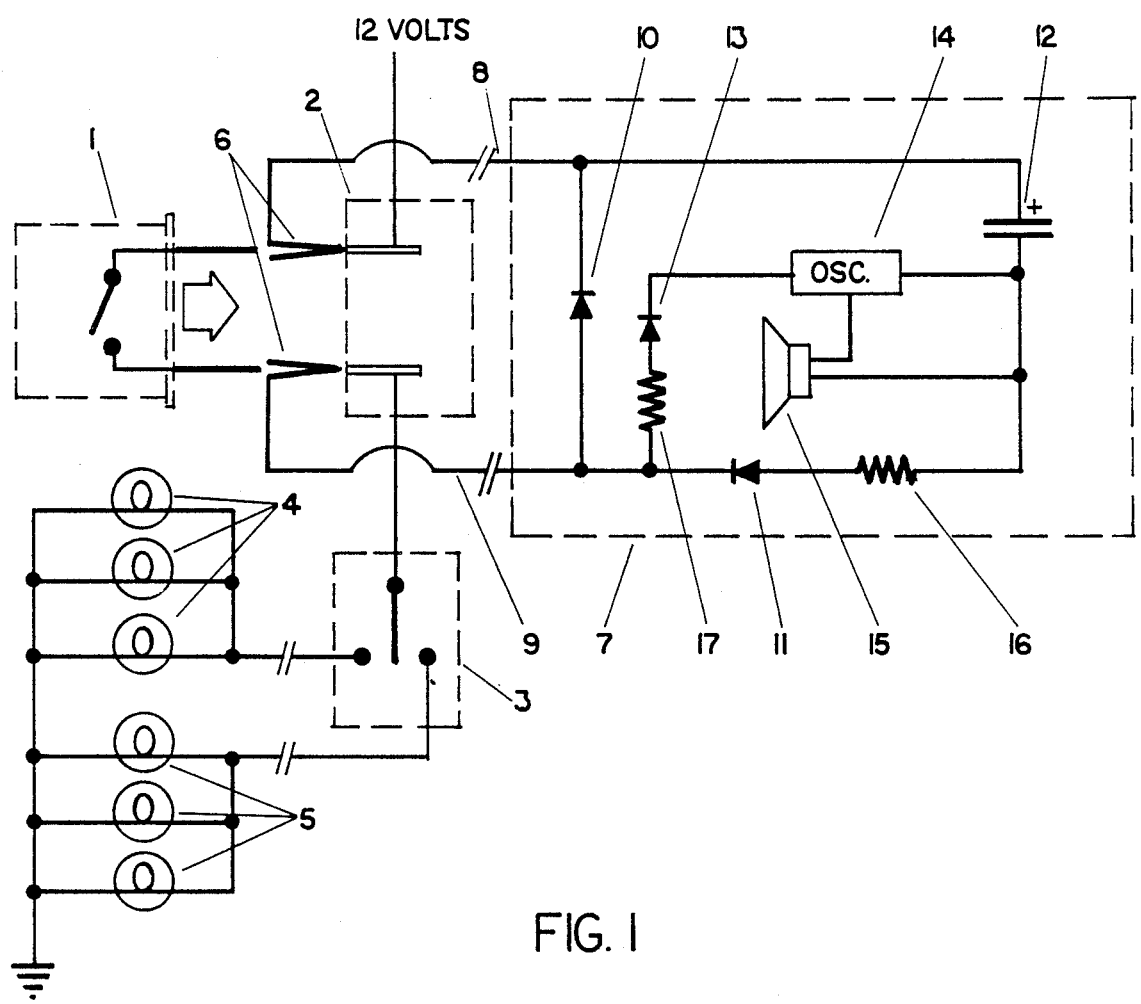
FIG. 1 is a generalllized schematic including the pertinent parts of a typical automotive signal light circuit.

Referring to FIG. 1, a typical automotive turn signal light system is represented, consisting of a standard flasher 1, a standard flasher socket 2, a standard turn signal switch 3 for selecting either the 'right turn' lights 4, the 'left turn' lights 5, or no lights. Depicted between the flasher 1 terminals and the flasher socket 2 are two interconnector probes 6, detailed further in FIG. 5 and 6. The probes are slipped over the flasher terminals, then the flasher is inserted into the flasher socket. Connecting the probes of the interconnector to the main circuit in case 7, are input wire 8 and output wire 9. Diode 10, connected across input and output wires 8 and 9 serves to completely short across the flasher 1 if the invention is connected backwards, thereby indicating the need to reverse the polarity of the interconnector probes 6. Diode 11, connected in series with capacitor 12 (4.7 mh), allows capacitor to charge to battery voltage when flasher 1 is open, but will not allow discharge current to pass when flasher closes. Diode 13 provides a path for discharge current through audio frequency oscillator 14. The oscillator's frequency is voltage independent so that the frequency of the oscillator output does not change as the voltage on the capacitor decays. Oscillator 14 drives audio transducer 15. As the charge on capacitor 12 decays, so does the voltage of the oscillating current throught the audio transducer, thereby reducing the volume of the output and creating a pleasant naturally decaying effect. A high value (120K ohms) resistor 16 is added in the charging path for two reasons; first—to slow down the charging rate of the capacitor so that, when used with a faster than normal flasher 1, a lower than normal capacitor charge will be reached each cycle, resulting in a quieter than normal sound being emitted from the transducer 15 each time the flasher 1 closes, having the effect of producing the same overall volume level. The second purpose of this resistor 16 is to eliminate the effect of noise in the automotive electrical system on the invention. With no resistor here, voltage spikes across the flasher contacts 1 temporarily increase the charge on the capacitor 12 through the charge diode 11. At the end of the spike, the capacitor discharges through the discharge path which includes the oscillator 14 and the transducer 15, resulting in audible noise. A high value resistor in the charging path is found to reduce this inaudible levels. Resistor 17 is provide to limit discharge current through oscillator 14 and transducer 15 to safe levels and to prolong the note, thereby using charge on capacitor 12 more efficiently.

Figure 2:
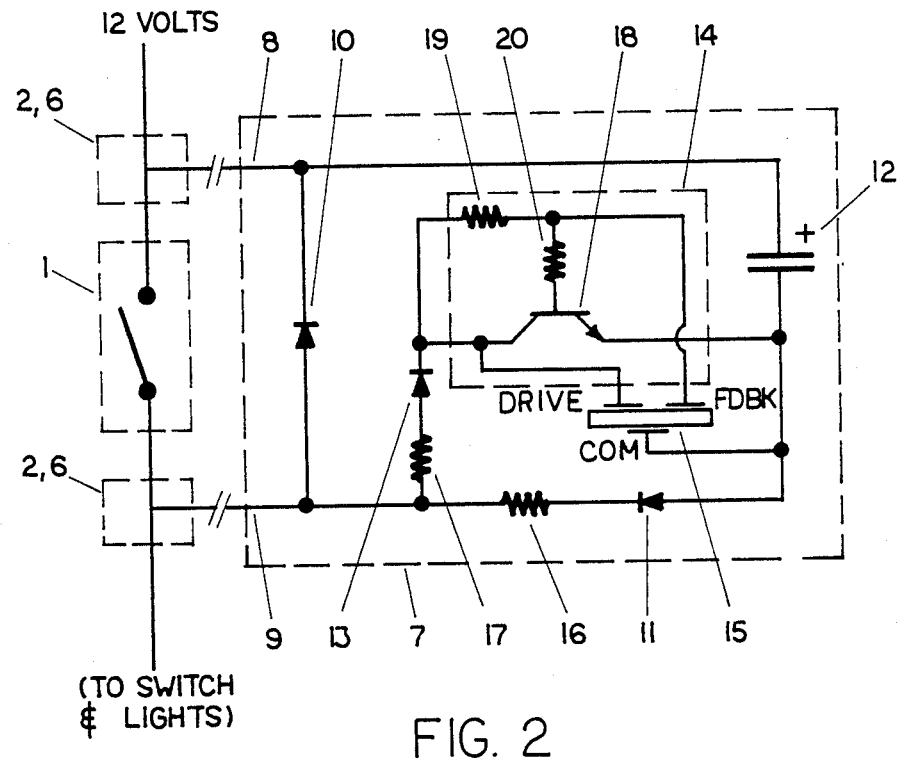
FIG. 2 is a detailed schematic of the preferred embodiment of the invention.

In FIG. 2, the preferred embodiment, a piezo-electric disc 15 is shown as the audio transducer and the components of the oscillator 14 are described. Upon initial discharge of capacitor 12, piezo electric disc 15, having a lower resistance than NPN transistor 18 conducts, driving its feedback terminal (fdbk) high, forcing the base terminal of transistor 18 high through resistor 20 (3.9K ohms), and putting the collector emitter junction into conduction, which shorts out the current through the disc 15. With no current through disc 15, voltage at the feedback terminal drops, dropping the voltage at the base connection of transistor 18, which ceases to conduct, forcing current through disc, and starting the cycle over. Resistor 19 (120K ohms) biases transistor 18 base slightly, but not into conduction. Piezo-electric disc 15 and transistor 18 as connected form an astable circuit which oscillates in the audible range.

Figure 3:
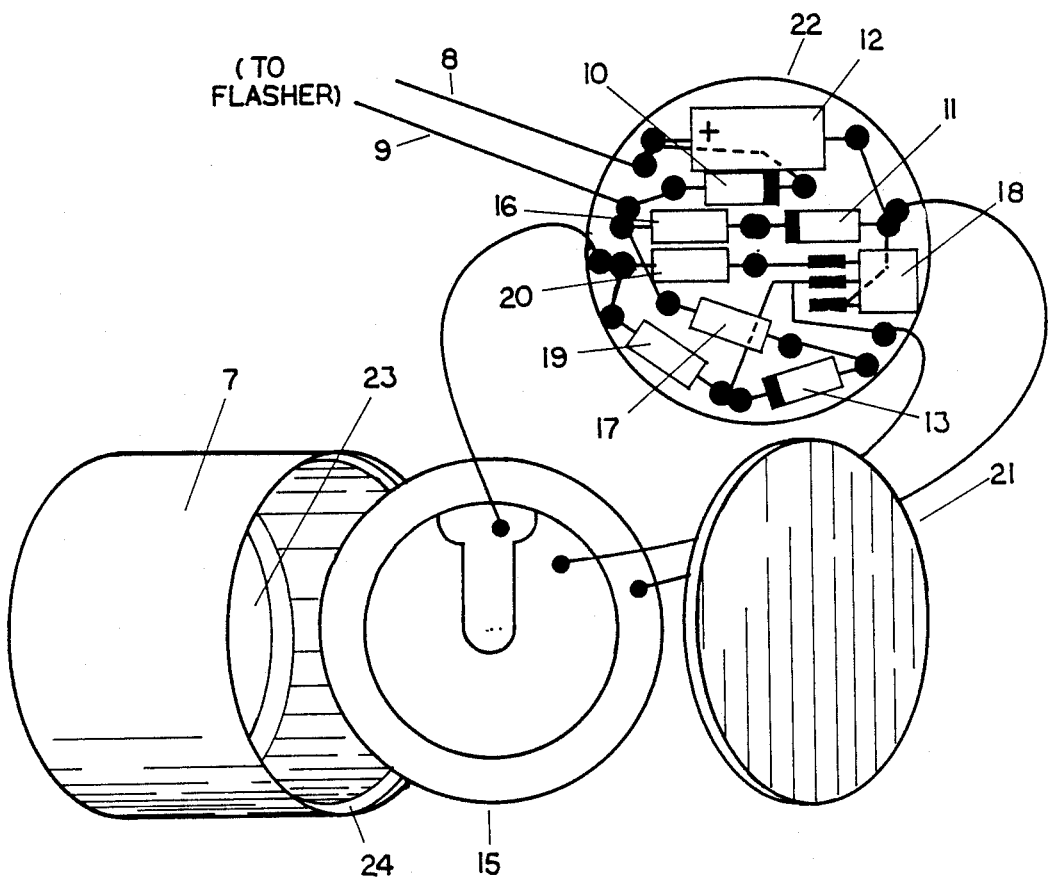
FIG. 3 is an enlarged view of the preferred embodiment of the invention, partially dissasembled, revealing the circuit of FIG. 2 reduced to practice.

In FIG. 3, a partially dissassembled view of the preferred embodiment is depicted, showing a standard piezo-electric buzzer case 7, opened, with case end 21 laying down on the right. Printed circuit board 22 is shown with all components (10 through 20 except 15) mounted in typical fashion. To assemble, piezo-electric disc 15 is placed in normal position against acoustic chamber 23 and glued, circuit board 22 fits into recess 24 in wall of case 7, case end 21 is glued in place on end.

Figure 4:
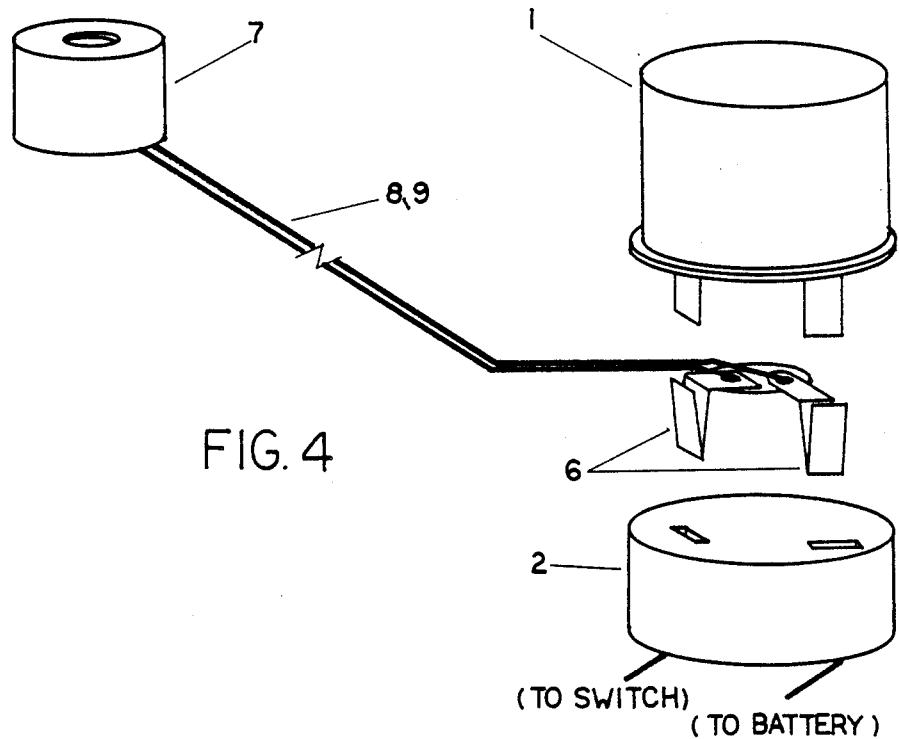
FIG. 4 is a view of the preferred embodiment of the invention, assembled, showing its connection to the flasher and flasher socket.

In FIG. 4, the assembled invention in case 7, with interconnector, is shown prior to insertion of flasher into probes 6 and then into socket 2.

Figure 5:
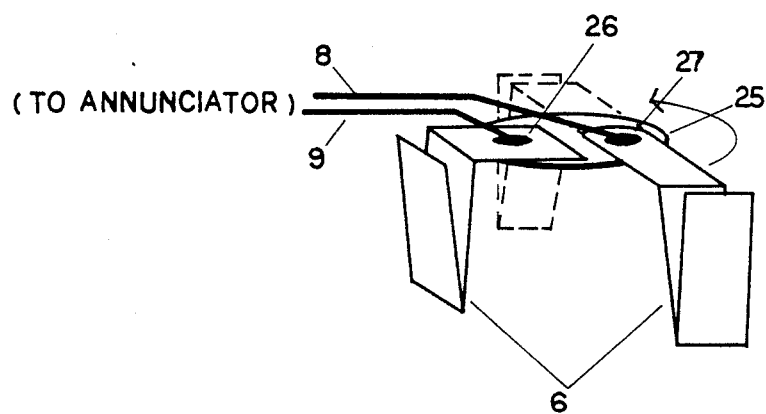
FIG. 5 is a view of the interconnector, showing that one probe can be pivoted.

In FIG. 5, the interconnector is depicted, showing thin metal probes 6 mounted on insulator material 25 with rivets or other means 26 and 27, noting that the probe to the right can be rotated around its means of attachment 27 into new position which when placed over flasher terminals 1, will engage opposite terminals.

What is claimed is:

1. In combination with a power source, signal lights and a flasher having two contacts intermittently opened and closed during operation to flash the signal lights on and off, an annunciator for signal light flashers comprising:

An input conductor connected to one of the flasher terminals and to one terminal of a capacitor, An output conductor connected to the second terminal of the capacitor and to the second terminal of the flasher, A first rectifying means connected in series with one of the conductors that allows charging current to pass and charge the capacitor when the flasher contacts are open, but that will not allow discharge current to pass, A second rectifying means, connected in parallel with the first rectifying means, but oriented in the opposite direction so that it blocks charging current, but allows dischage current to pass when the flasher contacts close, A resistor in series with the second rectifying means that limits discharge current, An audio frequency oscillator, connected in series with the second rectifying means that is driven by discharge current from the capacitor, An audio transducer connected to the output of the oscillator that is driven by the oscillator when there is discharge current, Whereby a brief tone is produced upon the closing of the flasher contacts, whose pitch is determined by the frequency of the oscillator, and whose duration and decay are determined by the charge on the capacitor and the resistance of the discharge path.

2. An annunciator for signal light flashers as described in claim 1, wherein said 'audio transducer' and 'oscillator' are (respectively) a piezo electric disc having a positive (drive) terminal, a negative (common) terminal and a third, feedback terminal thereon and an astably biased transistor, connected together, as described below, to form an astable circuit which ocillates in the audible range, thereby producing a tone which decays in volume as the capacitor discharges:

The positive terminal of the piezo electric disc being connected to the anode of the second rectifying means, the negative terminal of said disc being connected to the negative terminal of said capacitor, The third, feedback terminal being connected though a limiting resistor to the base connection of an NPN transistor, said base connection also being connected thru a biasing resistor to the anode of said second rectifying means, The collector of said transistor being connected to the anode of said second rectifying means with the emitter of said transistor being connected to the negative terminal of said capacitor, Whereby, during that portion of the flasher cycle when the flasher is open, the capacitor will charge through the first rectifying means, and after which, when the flasher closes, the capacitor will discharge through the path consisting of the second rectifying means, and initially, through the piezo electric disc, with discharge current through the disc driving the feedback terminal of the disc high, thereby driving the base terminal of the NPN transistor high, and the collector emitter junction into conduction, thereby shorting out the current through the disc and lowering the voltage at the feedback terminal, dropping the voltage at the base connection of transistor, thereby causing the transistor to cease to conduct, forcing current through disc, starting cycle over.

3. An annunciator for signal light flashers as described in claim 1 or 2, wherein said rectifying means are diodes.

4. An annunciator for signal light flashers as described in claim 1, wherein the connections to the flasher are made with an interconnector comprising:

Two bent probes connected to the input and output conductors, constructed of a thin conductive material such as tin and shaped to fit over the terminals of a standard signal light flasher prior to the flasher's insertion into a standard flasher socket and to remain connected to provide connection to the flasher terminals without interruption of the normal connection between the flasher and its socket, One of said probes being attached to a small, thin piece of electrical insulating material with rigid means of attachment such as a tight rivet, the other probe being mounted to the insulator material by means of pivotable attachment, such as a snug rivet, that allows 180 degrees of rotation, Whereby the probes are held in the generally correct position to fit over the flasher terminals, and that the probes may be re-configured to engage the opposite terminals of the flasher so that the polarity of said input conductors may be reversed.

* * * * *